Dec. 13, 1949  C. E. DREW  2,491,167
COLLET CHUCK
Filed March 19, 1946  3 Sheets-Sheet 1

INVENTOR.
Charles E. Drew.
BY
Bryant & Lowey
Attorneys.

Dec. 13, 1949 C. E. DREW 2,491,167
COLLET CHUCK
Filed March 19, 1946 3 Sheets-Sheet 2

INVENTOR.
Charles E. Drew.
BY
Bryant & Lowry
Attorneys.

Dec. 13, 1949  C. E. DREW  2,491,167
COLLET CHUCK

Filed March 19, 1946  3 Sheets-Sheet 3

INVENTOR.
Charles E. Drew.
BY Bryant & Lowry
Attorneys.

Patented Dec. 13, 1949

2,491,167

UNITED STATES PATENT OFFICE 2,491,167

COLLET CHUCK

Charles E. Drew, Racine, Wis.

Application March 19, 1946, Serial No. 655,577

9 Claims. (Cl. 279—48)

This invention relates to improvements in collet chucks, structures designed for use with service elements such as bar-shaped tools, drill shanks, stock bars, or the like, and has particular relation to chucks of this type especially designed for use in a service where a high degree of precision is desirable or essential.

The nature of collet chuck service is such as to present a number of important characteristics which must be met where efficient service is desired—where precision service is essential, the conditions are accentuated, and provision must be made to meet them with extreme care and accuracy. A few of the fundamental conditions are referred to briefly:

Since the collet is to provide a gripping relation to the service element with the chuck designed to transmit rotative movement to the element, in presence of the fact that the element must be insertible into the chuck and removable therefrom at will—in some services with great frequency—the collet must be capable of expanding and collapsing to receive and then grip the element, with the positioning and removal of the element made in simple fashion, with rapidity, and without materially disturbing the relationship of parts of the chuck. Hence, the chuck must rely upon friction for the power drive of the element, a condition which requires that the chuck be formed of a plurality of relatively movable members.

The service working zone of the element must be as free as possible of any gyratory conditions—the ideal is complete absence of gyration—to assure accuracy in the work to be performed; since the power is applied through a plurality of members by friction only, the ability to secure the minimum gyration is a major problem, due to the possibility of "cocking" of or more members—especially of the collet—produced when the axis of the element is not accurately alined with the axis of the chuck, and may result from a number of different causes; where frequent change in the element is required, each change can develop the condition and thus disturb the ability to provide precision service.

Due to the large demand for collet chuck assemblies, these must generally be provided under quantity production conditions; since in production operations such as these tolerance dimensions are practically an inevitable requirement, the likelihood of cocking, faulty friction conditions, etc., are constantly present, thus leading to loss of precision effects; even screw-threaded connections can produce such effects. The ideal chuck assemblage needs therefore be so fashioned that accuracy in the positioning and non-gyrating action of the working zone of the service element should not be affected by differences due to tolerance conditions; to secure such result is extremely difficult, especially under quantity production conditions, and must depend upon the structure and arrangement of the parts of the assemblage to obtain even approximate results in this respect.

Many developments in the field of collet chucks have been made and proposed, and some of these have been able to secure precision characteristics of a rather high order; in some forms the gyrations have been limited to approximately 0.0015 inch, while others have claimed a still lower variation from non-gyration; but such results, when present, are secured under the most favorable conditions and do not represent the normal conditions present when frequent change in the service element is necessary; generally, when such accuracy is present, other characteristics are less favorable due to the need for sacrificing advantages in one direction to secure advantages in a different direction.

In assemblages having the precision characteristics, the assemblage is generally made up of the shank member which is directly driven from the power source, and presents the axis base on which the remaining members are to be assembled to provide the desired result; the collet, which is presented in different forms; a nose piece or its equivalent; and a locking nut which has a threaded connection with one or more of the other members, and which serves, by its threading movements, to cause—generally indirectly—the expansion and collapsing movements of the collet. These have been given various shapes and assembled in different co-operative relationships.

The present invention is of this latter type and utilizes the same general member assemblage, but the shapes of members have been varied and they are assembled to cooperate in a somewhat different relationship from such earlier developments, with the changed formations designed to produce even more favorable solutions to the fundamental problems above referred to, as well as to other characteristics, than have been possible with the earlier developments, to thereby increase the efficiency of this type of assemblage; to make the production of the members in a more efficient manner; to increase the efficiency of the assemblage, and to provide a comparatively low cost of manufacture.

To these and other ends, therefore, the nature of which will be understood as the invention is hereinafter disclosed, said invention consists in the improved constructions and combinations of parts hereinafter more fully described, illustrated in the accompanying drawings, and more particularly pointed out in the appended claims.

In the accompanying drawings, in which similar reference characters indicate similar parts in each of the views.

Collet chucks of this general type utilize a collet which is externally tapered with the body slotted and having a bore to receive the service element, the bore being of a dimension to permit free entrance of the element, the collet structure being in its normal or expanded state at such time. To reduce the bore dimensions and thereby provide gripping action on the element, a collapsing action is applied to the collet itself by a tapered face carried by one of the other members of the chuck assembly with such face external of the collet tapered face and generally by relative and cooperative movement of such tapered face and the external tapered face of the collet, with the relative movement generally, but not always, in the direction of the axis of the bore.

In prior practice, and especially with assemblies especially designed for precision effects, the outer tapered face has generally been carried by the shank member; many different variations have been provided in assemblies of such type, involving the direction of relative movement, the form of the tapered faces, etc., each of the structures being designed to collapse the collet into a frictional gripping relation with the service element by movement of a threaded actuating member—generally carried by the shank—the member movement under the threading action being designed to set up the relative movement of the tapered faces in such manner as to produce the collapsing action on the collet.

While such arrangement would, theoretically, provide accurate alinement of the axes of the chuck and collet bore, due to the presence of the shank taper face as a part of the alining structure, such result is obtainable only where the collet and shank have their critical dimensions and faces present with absolute accuracy—variations therefrom directly affect the accuracy; since any inaccuracy is amplified by the fact that the working zone of the service element is more or less remote from the zone in which the collet is located, even very slight variations can materially affect the precision of the assembly. Since, under quantity production conditions, allowance must be made for tolerances, the possibility of obtaining absolute accuracy in the assembly is slight, and under the most careful workmanship and selection of parts, only approximate accuracy is to be expected.

The prior art developments include auxiliary measures for the purpose of reducing the amount of inaccuracy, but, as previously referred to, the secured results under the best obtainable conditions have shown variations in excess of .0005"; in addition, the assemblies are prone to produce other difficulties, due to the effort to obtain the axial alinement.

The present invention, while utilizing the skirt of the shank as a carrier for a control face, presents the taper face which co-operates with the collet taper face as not on the shank but on the nose-piece, the latter having a skirt zone which serves as a wedging formation between the inner face of the skirt of the shank and the taper face of the collet, thus permitting the collet-receiving portion of the skirt zone of the shank to be formed of uniform diameter and thus capable of more accurate machine production under quantity production conditions. With the nose piece having its skirt outer periphery also of uniform diameter, the nose piece member can advance, under the action of the locknut, into the space between the collet taper face and the shank skirt face with a true linear movement (being generally guided by the shank skirt face) and thus permit the opposing taper faces to co-operate to collapse the collet.

The nose piece may take on any one of a number of different forms with each form presenting the above fundamental conditions, the remaining members of the assembly being generally similar with all of the forms. A number of these variations are presented herein and explained in detail hereinafter.

Figure 1:
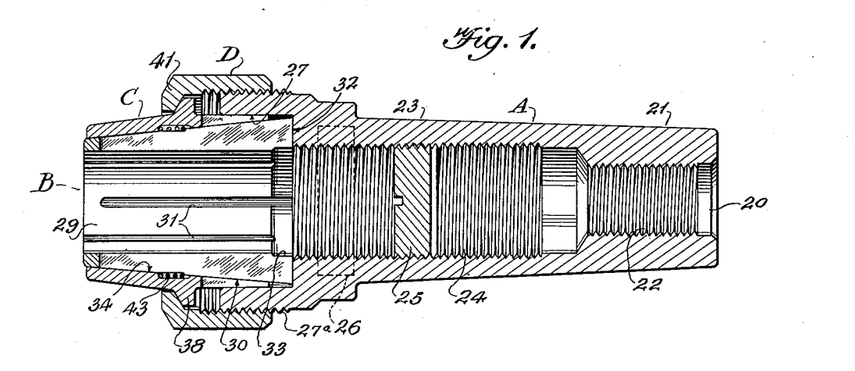
Figure 1 is a central longitudinal sectional view of one form of collet chuck according to the present invention.
Figure 2:
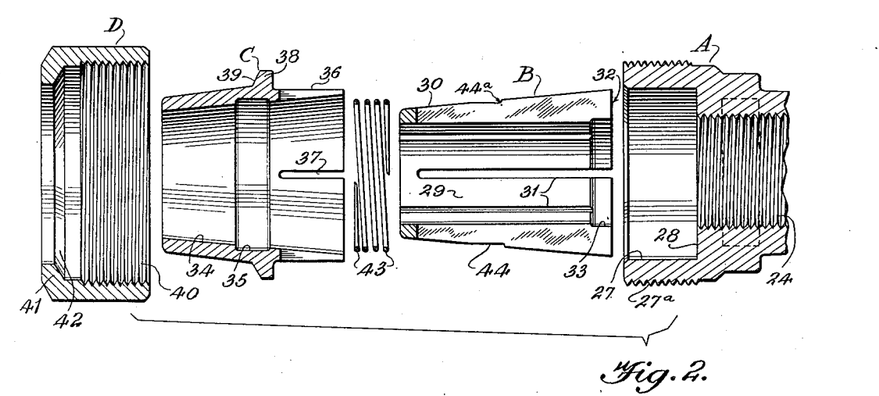
Figure 2 is an exploded sectional view of the members of the chuck of Figure 1.

In Figure 1, which presents the members of the present invention of collet chuck assembly in their assembled position with the parts assumed to be in service element gripping positions, the shank member is indicated at A, the collet at B, the nose-piece at C, and the locking ring or nut at D, this general identification being presented in all of the figures of the drawings; in Figure 2, these members are presented as individuals, the shank being partially omitted, since the omitted portion is clearly shown in Figure 1; Figure 2 presents an exploded showing of the structures of Figure 1.

The shank A is shown as an elongated member, having an axial bore 20 divided into a plurality of zones. The zone 21, located at an end of the member is the zone for securing the assembly to the power driving source, not shown—the draw bar, for instance—the bore in this zone being shown as threaded as at 22 to permit securing to such source. The intermediate zone of the shank, indicated at 23, has its bore of increased diameter, and includes an elongated thread zone 24 designed to receive an externally-threaded gauging member 25, designed to provide for adjustment of the depth to which the service element can be inserted within the assembly, the member 25 being suitably kerfed or otherwise fashioned to permit ready adjustment of position of the member through the open end of this portion of the bore when the parts are disassembled; member 25 is especially advantageous where the service element is one which requires accurate positioning and frequent change, the member assuring uniform depth of insertion. The exterior of this zone also includes the usual wrench flats or substitute formations for wrench, spanner or like use in securing the shank in position, the position of this being indicated by the dotted line representation 26 which can be considered as one of the facets of such formation.

The inner or opposite end of the shank forms the skirt zone 27 of the latter. This zone has the bore diameter considerably increased, as indicated in Figure 2, and forms the recess or basin into which the collet B extends, the inner diameter of this zone being of larger diameter than the greatest diameter of the collet. As heretofore pointed out, the recess or basin is of uniform diameter, a condition which enables greater accuracy in machining in order to provide this wall—indicated at 27—as having its axis accurately alined, with that of the bore axis—as truly concentric with the bore axis as possible. An important additional feature of this recess or basin formation is its bottom portion—the annular wall which is provided by the increase in bore diameter presented in this zone, this wall being indicated at 28. This wall 28 is preferably planar, but may be slightly varied from such form, but when so varied, it must have one general characteristic—like the planar form it must be based upon a line which is accurately perpendicular to the line of the bore axis, since the closer the approach of this wall face to exact conformance to such characteristic the greater becomes the precision characteristic of the assembly; the use of the planar form is of advantage under quantity production conditions due to greater accuracy in machining obtainable through the use of such form. The exterior of the skirt zone is threaded, as at 27ª, to receive the locknut D, as presently explained.

The collet B has the general characteristics of collets of this type, but has certain variations therefrom. Its bore 29 is of a desired diameter, and its periphery is tapered generally from end to end, at at 30; the collet is slotted longitudinally, preferably from opposite ends, as at 31, with the length of the slots such as to reach from one end toward and approach the opposite end—eight or more slots are preferably used. In the present invention the smaller tapered end of the collet forms the nose end, with the larger tapered end forming the base end, the end face 32 of the latter end relative to a line extending perpendicular to the collet bore axis and being designed to co-operate with face 28 of the shank; hence, face 32 is designed to be formed to mate with face 28— with both faces planar such mating is readily possible under quantity production due to the simpler machining operations. Since the length of the collet is considerable and its tapered form provides a considerable metal content at the larger diameter end, it is preferred to slightly increase the bore diameter within a small zone at such end, as at 33, thus decreasing the thickness of the metal at such end; however, the decrease does not materially decrease the radial thickness of the end so that face 32 and face 28, during service, present an annular mating relationship throughout an annular band zone of considerable width radially.

This latter condition is of importance due to the fact that such mating relation has a direct control in eliminating or preventing "cocking" of the collet through maintaining the axis of the collet in definite relation to the axis of the shank. With the assembly such as to present pressure on the collet in the direction of face 28, and with both faces 28 and 32 presenting an annular band of extended radial width and both based on the line accurately perpendicular to the axis of the shank, tightening of the assembly will cause the contact of the two faces to have the complete mating relation, thus assuring that the axis of the collet at both the nose and the base ends will have the desired definite and positive relation to the axis of the shank.

And in the production of this result the fact that face 32 is carried by the larger diameter end of the collet is of direct and major importance since it increases the diameter of the area within which effects, such as "cocking" for instance, may be detected by the face during locking of the assembly—the increased length of diameter amplifies the depth of the undesired variation at the periphery of the face, permitting earlier detection of the presence of the variation, as well as providing a longer leverage arm effect active in correcting the variation. As a result the "cocking" effect, when present, even though slight, is detected as the locking action proceeds and correction forcibly made as the locking action continues, the final mating relation between faces 32 and 28 placing the collet axis in its definite relationship with the axis of the shank bore.

The nose piece C of Figures 1 and 2 is one of a number of forms of this member which may be employed in connection with the present invention—other forms will be presently described. The axial length of member C is less than that of the collet and, in service position, preferably has its ends lying intermediate the ends of the collet, thus exposing the nose end of the collet. Since the nose piece overlies and is in contact with the tapered face 30 of the collet, its bore is also of tapered characteristic, the wall 34 of the bore presenting the taper rate values of the tapered face of the collet, and may be, as presently explained, of the two-step type; the continuity of the tapered face 34 may be interrupted by an annular recessed zone 35, located approximately midway of the length of the member, for a purpose presently explained. The nose-piece end of larger bore provides a skirt zone, the periphery of which, indicated at 36, is designed to co-operate with face 27 of the shank skirt, and hence is of uniform diameter and capable of ready machining. Since the outer face 36 and inner face 34 are not parallel, the skirt zone of member C is of wedging characteristic, with its thinnest radial section of wall located at such larger end of the tapered bore.

In this as well as in many other forms of nose-piece the skirt zone is slotted longitudinally, as at 37, the slots extending inwardly from the thin end of the skirt zone. This permits a slight flexing action of the skirt, making it possible to provide face 36 as of a less close fit with face 27, thus enabling freer insertion of the skirt zone into the space between face 27 of the shank skirt, and the tapered face of the collet; since, as indicated in Figure 1, the nose-piece skirt is positioned over a zone of increasing thickness of the collet with the zone located where the collet thickness is considerable, it can be understood that as the nose piece is advanced, its skirt zone can and would be sprung outwardly, a condition which will bring the face 36 into a mating relation with face 27, the springing action being provided by the less resistance of the relatively thin nose piece skirt zone to yield than the heavier zone of the collet formation with which the skirt zone is in contact. Hence, the periphery of the nose piece skirt may be of a sufficiently loose fit with respect to the shank skirt as to permit freer introduction of the nose piece skirt into the shank skirt with the springing of the nose piece skirt gradually tightening face 36 on to face 27 as the nose piece is advanced until the faces reach complete annular contact, after which further advance of the nose piece applies the entire resistance of the shank skirt and applied lock nut as opposing further skirt expansion, with the tapering faces then co-operating to apply the pressure needed to collapse the collet.

In other words, the advance of the nose piece gradually places between the shank skirt and the periphery of the collet, a member—the nose piece skirt—which serves as a substantially solid abutment between the shank skirt and the collet such that advance of the abutment produces a wedging action directly effective on the portion of the collet of heavier cross-section, and since the latter is yieldable because of the collet slotting, collapsing action on this zone of the collet is had; since the opposite end of the collet is of the smaller cross-section, the wall of the corresponding end of the nose piece has sufficient resistance to provide the collapsing effect on the nose zone of the collet.

For the purpose of applying the pressure to advance the nose piece, the latter carries an external annular shoulder 38 having a face 39 adapted to be engaged by the locknut D as presently described. Face 38 may be conical or spherical—in either case, the development of the face is based upon the true axis of the nose piece bore with such axis assumedly alined with the shank axis. Since face 27 is accurately formed concentric with respect to the shank axis, and the nose piece skirt is provided on the basis of a mating relationship with both face 27 and the tapered face of the collet, and with close tolerances in manufacture, it is apparent that as the nose-piece advances, mating faces 36 and 27 will force a collapsing of the base end zone of the collet in such manner as to bring the axis of the zone into alinement with the shank axis; and since such advance of the nose piece is also applying pressure on the collet longitudinally through the cooperating mating tapered faces, such latter pressure will be exerted in the direction of advancing the collet as well. Hence, should there be any "cocking" trend of the collet, such advancing pressure on the collet will cause a rocking movement of the collet to bring faces 28 and 32 into their mating relationship, thus swinging the nose end of the collet to place its axis into the alined relationship with the shank axis.

The locknut D is formed and dimensioned to be threaded to the threaded zone 27ᵃ of the shank skirt, the nut having internal threads 40 for this purpose, the thread zone extending inward from one end of the nut bore a suitable distance, the bore extending beyond such zone with the opposite end of the nut provided with an inwardly extending flange 41 with the inner face of the flange preferably formed conical, as at 42. The outer periphery of the nut is shaped in either of a number of well-known forms to permit tool or other power rotation of the nut—wrench, spanner or power camming will illustrate—thus providing the power needed for collapsing the collet by the threading action. Face 42 is designed to co-operate with face 39 of the nose piece to advance the nose piece to produce the collet-collapsing action.

The completed assembly is shown in Figure 1 in which the parts are assumed to have been moved to the service element gripping position by threading of the nut, the nose piece skirt lying in mating relation to both the face 27 of the shank skirt and the tapered face of the collet, with the collet collapsed sufficiently to provide the element gripping result. As is apparent, the assembly within the shank skirt zone thus provides a complete and substantially solid radial support for the gripped element with the support such as to place the collet under pressure stress sufficient to produce the desired gripping friction between the collet and the element, and to provide the power drive from the power source via the shank and its skirt, through this solid support, to the service element, although the driving relation between the elements from the shank skirt to the element is entirely frictional.

As will be understood, the co-operative relation between faces 42 and 39 presents an important feature in connection with the alining of the collet axis with the chuck axis. Assuming the face 39 to be based upon the true axis of the nose piece it is apparent that if the members are of accurate dimensions and form and properly positioned, the contact between these faces will be completely annular from the initial contact; should there be variations in manufacture within tolerance limitations, the initial contact may not be completely annular and thus present unequal advancing pressure applications by the locknut, causing adjusting in position of one or the other element in the effort to equalize the pressure conditions. Such adjustments affect the collet, even to the extent of slightly shifting the collet face 32 on face 28—but the adjustments will all tend in the direction of correctly alining the collet axis. This is especially true where face 39 is of the spherical type—co-operating with the conical face 42, the contact will be in the form of an annular line so that incomplete contact due to variations will be instantly made manifest, and the adjustments began and completed with definite accuracy; with the conical form of face 39 the detection may be by either the inner or outer limits of the contact zone and vary the pressure application to this extent, but completion of the uniform annular pressure will position the collet in the alined position, although the contact of faces 42 and 39 is then in the form of an annular band instead of line.

In other words, the alining of the collet axis with the shank axis, when the assembly needs alining activities, involves three general activities, one of these places the collet axis in definite relationship to the shank axis—alined with or parallel to the shank axis, this is provided by the mating faces 28 and 32. Another activity provides the advancing movement and aids in locating the collet axis in alinement with the shank axis—the function of faces 42 and 39. The third activity results from the co-operation of face 27 with the outer periphery 36 of the nose piece skirt, the importance of which lies in the fact that face 27 is a part of the shank and is based on the shank axis, and acts to substantially center this end of the collet on the shank axis during the locking activities of the assembly and in substantially alined axial relationship; equalizing of the pressure conditions as above described assures the alinement of the nose zone end of the collet.

These activities may take place concurrently or individually but, collectively they assure alinement of the collet axis with the axis of the shank within very small or slight limits. The latter will depend somewhat upon the selection of the elements in presence of the tolerance conditions set up under quantity production methods—if the selection assembles completely accurate members, the alinement will be completely accurate, with the greatest variance therefrom presented through selection of members having maximum tolerance conditions.

As is apparent, the assembly in its locked condition, will have the nose piece skirt wedged tightly between the shank skirt and the collet with the latter exerting pressure to maintain this status. Hence, when the locking nut is unthreaded the pressure of the collet would tend to maintain the wedged condition. To assure release of the nose piece, a releasing spring 43 (Figure 2) may be utilized. This spring is located in the recess 35 of the nose piece; since it is exposed with respect to the tapered face of the collet, the latter is provided with an annular recess 44, the bottom of which is parallel with the collet axis, thus causing such recess 44 bottom to extend from the tapered face at one edge of the recess to a shoulder 44a at the opposite edge; the width of the recess 44 is less than that of the recess 35. Hence, when the nose piece is advanced sufficient to place the advance end of the spring in contact with shoulder 44a, further advance of the nose piece compresses the spring and provides a pressure value sufficient to shift the nose piece to release the skirt of the latter upon release of the lock-nut. The spring may perform an additional function dependent upon whether or not the face 32 of the collet is in actual and proper contact with face 28; if these faces are not in contact, the advance coil of the spring will contact shoulder 44a earlier, in which case the power produced by compression of the spring is exerted on shoulder 44a to aid the friction between the tapered faces in advancing the collet to set up the mating relationship of faces 32 and 28.

In practice, the shank, collet and lock nut, are of generally uniform types, excepting possibly as to dimensions; however, the nose piece is variable, a number of forms being usable in the assembly. A number of such forms are disclosed herein, and each generally in common with the form shown in Figures 1 and 2, presents one fundamental characteristic that is generally common to all, viz: uniform expansion at the skirt of the nose piece achieved with a minimum of collet deformation and its proportional loss of gripping power; in other words, the nose piece skirt is fashioned in such way that it can be brought into substantially mating relation with face 27 without applying sufficient pressure on the corresponding end of the collet such as would cause gripping action on the service element limited to such end zone of the collet—in the latter case the gripping power would be limited to such zone, whereas the assembly is designed to provide for gripping power approximately throughout the length of the collet, as indicated by the particular form of the collet slotting shown.

Figure 3:
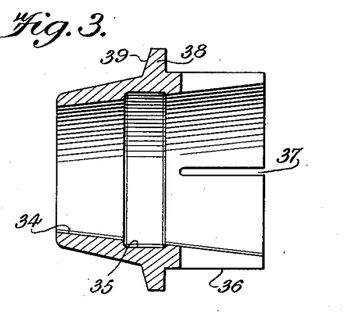
Figure 3 is a longitudinal sectional view of a modified form of nose piece.

The simplest form of nose piece contemplated is shown in Figure 3, in which the skirt is of greater thickness than the skirt of Figures 1 and 2; hence, although the slotting is similar to that of Figures 1 and 2, the skirt is less elastic than that of Figure 1; however, the skirt is thin enough as to allow at least a small amount of expansion permitted by the presence of the slots—sufficient expansion to permit ready entrance of the skirt into the shank recess while permitting the above fundamental to be active, the heavy cross-section of this end of the collet providing sufficient resistance to produce the latter effect. With this form tolerances must be small; if the slots were omitted, no tolerances could be permitted, and the outer diameter of the skirt would need to equal the diameter of face 27 to provide the mating relation between faces 36 and 27, making advance of the nose piece into and within the chuck recess of such difficulty as to render the structure difficult for service.

Figure 4:
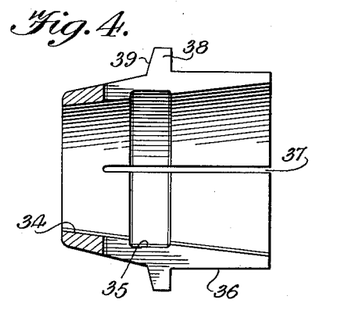
Figures 4 to 8 are respectively longitudinal sectional views of other modified forms of nose piece.

Figure 4 presents the nose piece as of general configuration similar to Figure 3, but the length of the slots has been sufficiently increased as to extend beyond the zone of flange shoulder 38, thus increasing the elasticity of the skirt zone. While this includes shoulder 38 as within the slotted area, this fact does not materially affect the shoulder service, since the shoulder is located in a zone where the flexing is so small as to be negligible in view of the fact that the annular form of the shoulder would cause face 39 to properly function despite the presence of the slots. In some forms of assembly, it is possible that the slotting of the nose piece can, as with the collet, extend from opposite ends of the nose piece.

The selection as to the length of the slots is dependent upon the allowance made between the inner diameter of face 27 and the outer diameter of face 36 in fashioning these parts, and thus bears upon the amount of tolerance to be permitted in the construction of the parts, increase in the length of the slots permitting larger tolerances, the increase in elasticity provided by the longer slots substantially compensating for the tolerance increase.

Figure 5:
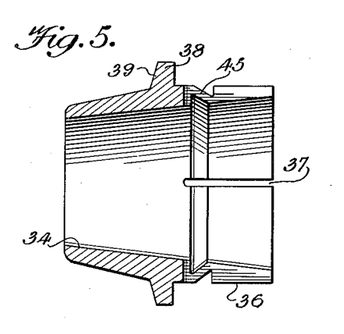
Figure 6:
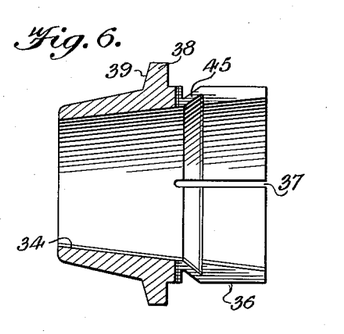

Figures 5 and 6 present increased elasticity to the structure of Figure 3, by providing a thinner cross section adjacent the zone of shoulder 38. This is provided by an annular groove, angular in cross-section, on the outer face of the skirt and a second annular groove on the inner or bore face of the skirt, these grooves being displaced sufficiently to provide a thin-wall zone 45 within the skirt with the wall extending angular to the axis as well as the taper face of the nose piece. The slots extend across this thin-wall zone. Figures 5 and 6 present the thin wall as extending at opposite angles.

As is apparent, the thin-wall zone permits greater elasticity of that portion of the skirt which generally provides the wedging section of the skirt. One advantage of this is the fact that the zone will assure that the face 36 of the skirt will mate with face 27 in the service positions of the parts throughout the length of the overlapping zones of the skirts (shank and nose piece) thus adding to the precision development; absence of this thin-wall zone, as in Figure 3, may decrease the length of the mating zone, due to the lower degree of elasticity and thereby restrict the resistance active zone provided by face 27 and thus reduce the length of the resistance zone to a slight extent but without material loss of the collapsing effect in the assembly, since a substantially complete annular contact with face 27 is present.

Figure 7:
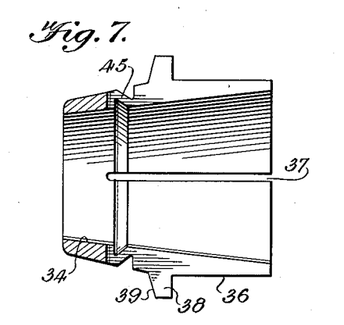

Figure 7 illustrates the application of this thin-wall feature to the Figure 4 form—the specific form of thin wall being similar to that of Figure 5; obviously, the thin wall form of Figure 6 may be substituted for the form of thin wall shown.

Figure 8:
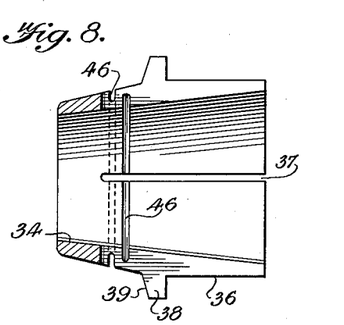

Figure 8 presents a variation in the method of providing the thin wall formation. Annular kerfs 46 are substituted for the angular form of the grooves, the depth of the kerfs being normal to the axis of the nose piece, the two kerfs being displaced to provide the thin wall section between them. The formation is shown as applied in the Figure 7 position, but may obviously be applied in the positions of Figures 5 and 6.

While each of these forms presents the face 39 as conical, it is to be understood that said face may be of the spherical type as previously explained.

With the structures disclosed in Figures 5 to 8, it is preferred that the outer diameter of the skirt of the nose piece be equal to or slightly greater than the diameter of face 27 of the chuck shank. The elasticity of the skirt produced through the presence of the thin-wall zone is increased thereby sufficiently to permit the slight nose-piece skirt collapsing necessary, if the skirt is oversize in this respect, to permit the skirt to enter into the shank recess, only a slight pressure being needed to produce this effect. Such arrangement produces the advantage that the mating contact between faces 36 and 27 will extend throughout the overlapped length of these faces even though the skirt is slotted; the larger completely-mated zone assures a longer fixed resistance length to the skirt and thus assures the more positive collapsing pressure upon the collet within this zone, since the pressure is uniformly developed. The oversize condition will not materially increase the friction between faces 36 and 27 due to the skirt elasticity; hence, the advance of the skirt during the locking activity is not materially affected by this change, the friction development being due to the value of the collet resistance to collapsing within the zone in either case. Since face 27 is accurately concentric to the axis of the shank, the increased length of completely-mated contact therewith by face 36 will obviously improve the precision effects produced without affecting or increasing the collet distortion.

In the forms which include the thin-walled zone, it is preferred to utilize a different means (presently described in detail) for releasing the nose-piece from its skirt-wedged condition upon unthreading the locking nut. Since the production of the thin-walled zone provides a recessed effect on the tapered bore of the nose-piece, it is preferred to omit the recess 35 therefrom, and hence a different arrangement for releasing the nose-piece from that disclosed in Figures 1 and 2 is provided.

While the forms of nose piece shown in Figures 5 to 8 provide for elasticity sufficient to permit the use of an oversize skirt and the complete mating relation between faces 36 and 27, the amount of oversize should be limited, due to the fact that the radial thickness of the skirt controls the amount of the collet collapsing in such zone—if the thickness is excessive, the collapsing will be increased and could possibly exceed that applied to the nose end zone of the collet, a condition which could affect the collet gripping of the service element, thus providing a zonal effect rather than a distributed effect, the active gripping zone in such case being at the inner end of the collet. On the other hand the amount of expansion of the skirt of Figures 1, 3 and 4, for instance, and in which the skirt is slightly expanded to provide the contact between faces 36 and 27, should also be limited since excessive expansion could provide insufficient collapsing of the collet at such end and with the result that the collet gripping would become zonal but with the active zone found at the nose end zone of the collet. If a zonal gripping contact is desired, these facts can indicate the way in which a desired gripping contact can be secured. However, the preferred arrangement is one in which the gripping contact is distributed throughout the length of the collet, and since faces 27, 28, 32 and 36, can be readily machine provided on the basis of close tolerances, it is possible to produce a precision effect and distributed gripping action in either of the forms; with close tolerances, the engineer is able to design the dimensions of his theoretical product to meet individual conditions and produce the type of gripping action desired by controlling the amount of difference between the diameter of face 36 and the diameter of face 27—the closer the fit between these faces the less will be the collet deformation and loss of gripping power.

Figure 9:
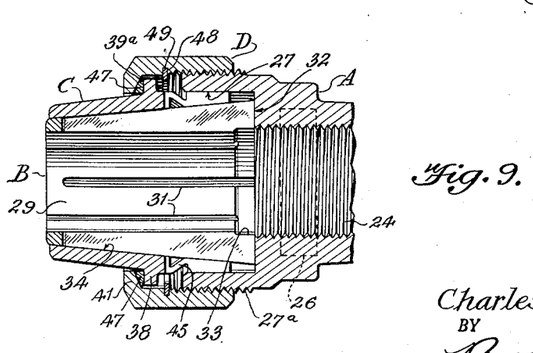
Figure 9 is a longitudinal sectional view of a modified form of assemblage.

Figure 9 presents another form of nose piece and assemblage, this being more complicated than the forms previously described. In this form the face 39 of the nose piece extends in a plane perpendicular to the nose-piece axis, as at 39ª, the characteristics of face 39 being provided by a stress relief ring 41 having a planar face on one side—to co-operate with face 39ª— the opposite side having a spherical characteristic—cooperative with face 42. Since the ring can float over face 39ª during the locking operation, it is apparent that the assemblage is able to correct itself by virtue of a continuous line of contact between the locknut face 42 and the spherical face of the ring regardless of the alinement of the locknut axis. The advantage of this form lies in the fact that distortion from twist is greatly decreased, as well as distortion due to misalinement of locknut and nose-piece. With this form the face 42 needs be conical or spherical. In other respects, the nose-piece is shown as of the type of Figure 5, but could be the Figure 6 form.

Figure 9 also discloses the alternative form of nose piece release means, groove 35, recess 44ª and spring 43 being omitted, thus leaving the tapered face of the collet uninterrupted. As a substitute, the inner face of the body of the lock nut beyond the thread zone is provided with an annular recess 48 to receive a split ring 49 (see also Figures 11 and 11a) of a sufficiently greater radial cross-sectional thickness than the depth of recess 48 as to provide an inwardly extending shoulder located between the end of the shank skirt and the flange shoulder 38; the ring is sufficiently elastic to permit ready entrance into the lock-nut over the thread zone of the latter and be seated within recess 48, being positioned in the lock-nut after the nose piece has been located within the lock-nut prior to the threading of the locknut on to the shank shirt thread zone. The ring shoulder is inactive during the advancing threading of the lock-nut—face 42 is active during this period; when, however, the lock-nut is rotated during the unthreading operation, such rotation brings the ring shoulder into engagement with shoulder 38 whereupon further unthreading action applies pressure to shoulder 38 to withdraw the nose-piece skirt from its wedged position between faces 36 and 27. As heretofore indicated, this form is preferably utilized in all structures of nose-piece having the thin-wall section. This form of release means lacks the function of also advancing the collet that is present in the form shown in Figures 1 and 2.

Figure 10:
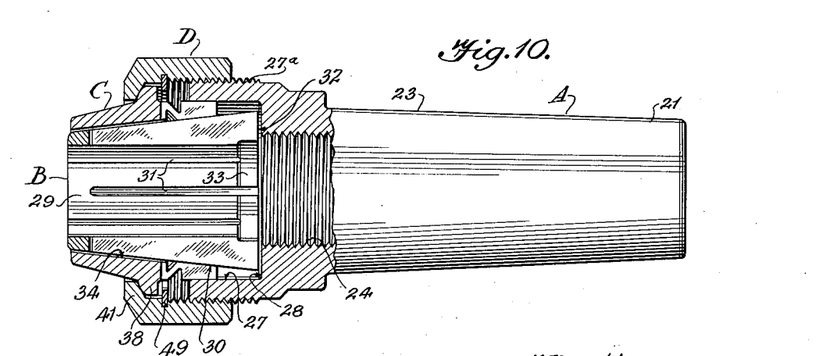
Figure 10 is a longitudinal sectional view, partly in elevation, of a still further modification, the view showing an intermediate position of the parts in locking the chuck.
Figure 11:
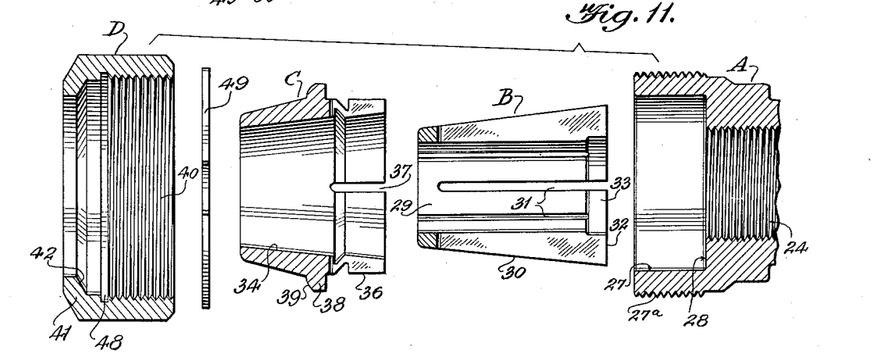
Figure 11 is an exploded sectional view of the chuck members shown in Figure 10.
Figure 11A:
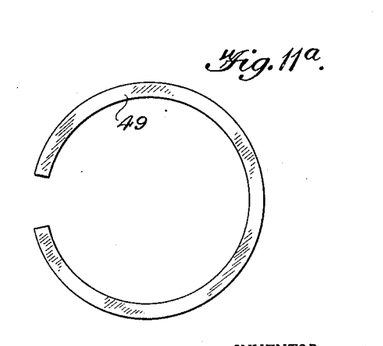
Figure 11a is a side elevation of the stress relief ring.
Figure 12:
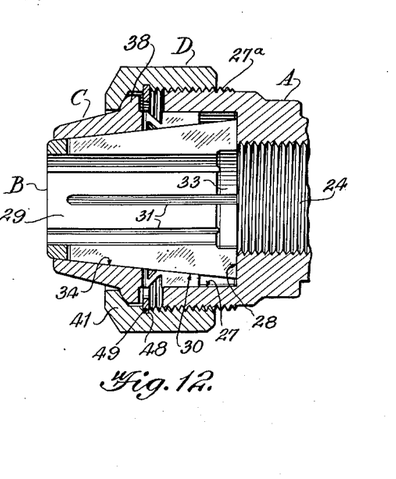
Figure 12 is a fragmentary view of Figure 10, but with the members in fully locked positions.

Figures 10 to 12 illustrate a still further modification of the assembly and more particularly of the nose piece, the principal distinction being in connection with the tapered bore face of the nose piece, the latter otherwise being of the general type of Figure 5, but which would also be usable with the Figure 6 form, the assembly including the stress release ring 49 previously referred to as employed with the nose piece structures having the thin-walled zone, the underlying purpose being to produce a two-step effect in connection with the bore face, and is particularly adapted for service under assembly conditions where the collet is initially inserted a distance insufficient to seat it against the shank, the subsequent advance of the nose piece completing the collet advance to its final position.

The effect can be produced either by grinding the bore face with two steps, with both steps having equal taper rates, but with the skirt step having a reduced diameter as compared with a continuation of the taper of the opposite end of the bore; in such case the skirt outer diameter would equal or slightly exceed the inner diameter of the face 27 of the shank, as before explained. An alternate way of producing the effect would be to have the bore taper continuous from end to end (excepting for the thin-walled zone), thus simulating the showing of Figure 5, and then producing the desired two-step effect by making the outer diameter of the skirt (face 36) oversize—the thin-wall zone will permit the necessary collapse of the skirt to enter the basin of the shank skirt; due to the oversize such collapse of the skirt will carry the skirt zone inward without affecting the opposite end zone, thus producing the two-step effect.

In practice, with the collet advanced to a position approaching face 28, the nose piece skirt is entered into the wedging zone and the nose piece advanced until the tapered bore of the nose piece skirt contacts the tapered face of the collet. Further advance of the nose piece will then advance the collet until face 32 mates with face 28 and ends the advance of the collet—during this advance there is no collapsing of the collet, the latter action beginning when the mating relation of faces 32 and 28 is established; the advance of the nose piece will also bring the taper face of the opposite end into contact with the tapered face of the collet (the step values being such as to produce this result), so that when the mating of faces 32 and 28 has been completed, the complete tapered face of the nose piece is made active on the collet to collapse the latter.

As is apparent, should the face 32 of the collet be out of contact with face 28—as indicated for instance in Figure 10—during the assembly of the chuck, the assembly development will produce a series of activities having definite value in the alining of the collet and shank axes. With the nose-piece within the lock-nut and both disengaged, the skirt of the nose-piece can be collapsed sufficiently to enter the shank skirt, and then advanced until the opposing tapering faces contact, an action which will tend to correct a "cocked" collet by the action of setting up a mating relation between the collet and the nose piece skirt, the nose end of the collet being out of contact with the nose piece—and at the same time substantially aline the axis of this end of the collet with the axis of the shank, due to the contact of faces 36 and 27 with the latter accurately concentric with the shank axis; the lock-nut will have reached a threaded connection status with threads 27a; cocking of the collet is not necessarily completely removed by such action due to the presence of the thin-walled zone so that the nose end of the nose piece could slightly vary from a true axial alinement. As threading of the locknut continues such embryo assembly advances bodily until face 32 contacts face 28—should such contact indicate the presence of "cocking" of the collet, the further threading of the lock-nut will force mating of faces 32 and 28, eliminate the cocked condition, and place the collet axis in alinement with the shank axis. And since the nose end of the nose piece will have also advanced sufficiently to bring the bore taper of this end into contact with the collet taper face, the mating of faces 32 and 28 will prepare the assembly for the collet collapsing action by the continued advance of the lock-nut, with the bore taper of the nose end of the nose-piece positioned in mating relation to the collet taper face—thus axially alining the axis of the nose-piece with that of the alined collet and shank axes, faces 39 and 42 serving to produce a similar condition with respect to the lock-nut.

This detail explanation makes clear one condition that is a fundamental of the present invention, viz.: that, in reality, the nose-piece is actually alined by the collet through the mating of faces 32 and 28, although the co-operation of faces 36 and 27 positions one end of the collet axis in its alined relation to the shank axis. This condition is present in the forms presenting the thin-walled zone, and also with the remaining forms in which the active length of contact of faces 36 and 27 is more limited in the direction of length of the chuck axis.

Among the advantages of this particular form are the following: Limited length of contact of the tapered faces of collet and nose-piece during the approach of the collet to its final position and prior to mating of faces 32 and 28; this leaves the nose ends of collet and nose piece with greater freedom for relative adjustments during the period—although the skirt of the nose piece is in mating relation with face 27, the thin-wall section permits the nose ends the freer adjustability. The collet is not subjected to collapsing pressure during such period, and since the tapering faces are brought into complete contact concurrently with the mating of faces 32 and 28—produced by the advance of the nose-piece tapered face—the collapsing pressures on the collet are equally-effective over the length of overlap of the tapered faces thus providing for uniform collapsing of the collet, with the pressures applied to a collet having its axis alined with the shank axis, producing distributed and uniform gripping action, thus limiting collapsing pressure on the collet to periods when faces 32 and 28 are mated and the chuck members have become substantially alined axially.

The advantages accruing from the use of the assembly in the varied forms shown have been indicated above as the individual forms have been described. In addition, the particular arrangement of the assemblage as an entirety presents the fundamentals above referred to. The members are of such form as to be readily produced under quantity-production methods, including tolerances, the critical co-operating faces being so arranged that they can be readily produced under close tolerance conditions, thus not only permitting comparatively low-cost production, but doing so with the possibilities of precision service conditions of a high order. Another advantage lies in the fact that the chuck is placed in locked condition by movements of the members (excepting the lock nut) limited to the direction of length of the chuck axis, so that no twisting effects on members is set up during the movements to the locked position, while the collet-collapsing is wholly by radial pressures—with the nose piece and the collet both slotted in the direction of the member axis, twisting during the period could produce undesired effects; while the lock-nut is rotative, faces 42 and 39 prevent the rotary movement being carried to the nose-piece.

In the above description of the invention and its detail characteristics, the description has been based upon what are deemed preferred forms of the invention, but without attempting to indicate variations therefrom and which are also deemed to be within the invention, but which involve certain changes or modifications from the preferred forms; these will now be set forth in detail:

At the outset, it is to be noted that while the shank has herein been referred to as being driven and rotatable, the invention is in such form as to parallel usual chuck service, in that it is capable of use either as a rotating or drive assemblage or as a stationary assemblage with the work serving as the rotative source co-operative with the chuck and its carried element. If the shank be held stationary the latter condition becomes operative. Hence, both types of operation are contemplated by and deemed to be within the invention.

One of the possible variations is that of the omission of a specific automatic nose-piece release formation—the spring 43 of Figure 2 or the element 49 of Figure 11; these are desirable and preferred for the purpose of withdrawing the skirt of the nose-piece from its wedged position. However, it is apparent that where the taper angle between the collet and the nose-piece is sufficiently large, the stored energy of the collapsed collet will be sufficient to provide such withdrawal, in which case the preferred withdrawal means—including recesses 35 and 44—could be omitted. Such variation, including the omission of the preferred means is contemplated by and is deemed to be within the present invention.

Another of the possible variations is that of omitting the slotting of the nose piece. It is possible, due to the specific form and location of face 27 of the shank skirt and face 36 of the nose piece, that accurate workmanship in the production of these faces would provide a sufficiently close fit of these faces and yet permit ready assembly, so that no material outward yield of nose piece skirt portions would be needed to provide the desired resistance needed for collapsing the collet, or that the end zone of the skirt of the nose piece be made sufficiently thin that any slight expansion required can be secured by annular stretching provided by the resistance of the collet during collapsing of the latter. Where the use is such as to permit such solution or solutions, the slots 37 may be omitted—and such omission is contemplated by and is deemed to be within the present invention.

Another obvious variation, which contemplates the omission of the automatic withdrawal means is that of first removing locknut D and then withdrawing the nose piece by the use of a lever or an air cylinder or other power means of well-known form. Such variation is contemplated by and is deemed to be within the invention.

While I have herein shown and described a number of forms and ways in which the invention may be produced and placed in service, it is apparent that changes and modifications in one or more of the members of the assembly may be found desirable or essential in meeting the various exigencies of use and the desires of users, and I reserve the right to make any and all such changes and/or modifications as may be found desirable or essential, insofar as the same may fall within the spirit and scope of the invention as expressed in the accompanying claims, when broadly construed.

What is claimed as new is:

1. A chuck having a shank provided with a cylindrical wall extending inwardly from one end concentric with its longitudinal axis, and a shoulder spaced from said end and crossing said axis to provide a cylindrical recess concentric with the longitudinal axis of the shank and having a flat bottom at right angles to said axis, a tubular collet extending into said recess and having a flat inner end seated against said shoulder to maintain axial alinement of said collet with said shank and having its outer longitudinal surface tapered with the larger end adjacent said shoulder, a nose piece having a portion wedged between and fitting said wall and said outer surface to center the collet in said shank by engagement of said nose piece with said wall, and a clamping ring adjustably mounted on said shank adjacent said end and overlapping a part of said nose piece and exerting pressure to hold said collet in axially alined engagement with said shank and said nose piece against said wall, respectively.

2. A chuck having a shank provided with a cylindrical wall extending inwardly from one end concentrically with its longitudinal axis and a shoulder spaced from said end and crossing said axis to provide a cylindrical recess concentric with the longitudinal axis of said shank and having a flat bottom at right angles to said axis, a tubular collet extending into said recess and having a flat inner end seated against said shoulder to maintain axial alinement of said collet with said shank and having its outer longitudinal surface tapered with the larger end thereof adjacent said shoulder, a nose piece having a portion wedged between and fitting said wall and said outer surface to center the collet in said shank by engagement of said nose piece with said wall and terminating forwardly of the inner end of said collet, and a clamping ring adjustably mounted on said shank adjacent said end and overlapping a part of said nose piece and exerting pressure to hold the collet in abutting axially alined engagement with said shank and said nose piece in centering relation with said shank, respectively, said nose piece having its inner surface tapered to engage the outer surface of said collet and its outer surface where it engages said shank provided with a truly cylindrical portion fitting the cylindrical wall of said shank recess.

3. A chuck having a shank provided with a cylindrical wall extending inwardly from one end concentric with its longitudinal axis, and a shoulder spaced from said end and crossing said axis to provide a recess, a tubular collet extending into the recess and seated against said shoulder having its outer longitudinal surface tapered with the larger end thereof adjacent said shoulder, a nose-piece having a portion wedged between and fitting said wall and said outer surface, a clamping ring adjustably mounted on said shank adjacent said end and overlapping a part of said nose-piece, and means operable to push the collet with the nose-piece away from said shoulder upon loosening of the clamping ring.

4. A chuck having a shank provided with a cylindrical wall extending inwardly from one end concentric with its longitudinal axis, and a shoulder spaced from said end and crossing said axis to provide a recess, a tubular collet extended into the recess and seated against said shoulder having its outer longitudinal surface tapered with the larger end thereof adjacent said shoulder, a nose-piece having a portion wedged between and fitting said wall and said outer surface, and a clamping ring adjustably mounted on said shank adjacent said end and overlapping a part of said nose-piece, said nose-piece intermediate its ends and beyond the portion engaging said wall being reduced in thickness throughout its wall area to increase the elasticity of the nose-piece to enable shortening under clamping pressure.

5. A chuck having a shank provided with a cylindrical wall extending inwardly from one end concentric with its longitudinal axis, and a shoulder spaced from said end and crossing said axis to provide a cylindrical recess concentric with the longitudinal axis of said shank and having a flat bottom at right angles to said axis, a tubular collet extended into the recess and having a flat inner end seated against said shoulder to maintain said axial alinement of said collet with said shank and having its outer longitudinal surface tapered with the larger end thereof adjacent said shoulder, a nose-piece having a portion wedged between and fitting said wall and said outer surface to center the collet in said shank by engagement of said nose-piece with said wall, and a clamping ring adjustably mounted on said shank adjacent said end and overlapping a part of said nose-piece and exerting pressure to hold said collet in abutting engagement with said shank and said nose-piece against said wall, respectively, said nose-piece having a shoulder overlapped on one side by the clamping-ring, said nose-piece also having a part thereon overlapping the other side of said ring to cause the nose-piece to move in opposite directions with the clamping ring.

6. A chuck having a shank provided with a cylindrical wall extending inwardly from one end concentric with its longitudinal axis, and a shoulder spaced from said end and crossing said axis to provide a recess, a tubular collet extended into the recess and seated against said shoulder having its outer longitudinal surface tapered with the larger end thereof adjacent said shoulder, a nose-piece having a portion wedged between and fitting said wall and said outer surface, and a clamping ring adjustably mounted on said shank adjacent said end and overlapping a part of said nose-piece, said clamping ring having an internal annular groove and a ring mounted therein and overlapping the other side of said nose-piece.

7. A chuck having a shank provided with a cylindrical wall extending inwardly from one end concentric with its longitudinal axis, and a shoulder spaced from said end and crossing said axis to provide a recess, a tubular collet extended into the recess and seated against said shoulder having its outer longitudinal surface tapered with the larger end thereof adjacent said shoulder, a nose-piece having a portion wedged between and fitting said wall and said outer surface, and a clamping ring adjustably mounted on said shank adjacent said end and overlapping a part of said nose-piece, said nose-piece having a shoulder overlapped on one side by the clamping-ring, said nose-piece also having a part thereon overlapping the other side of said ring to cause the nose-piece to move in opposite directions with the clamping ring, said nose-piece having a relatively elastic portion intermediate its ends to enable shortening under clamping pressure, and said collet at its larger end having its bore enlarged to minimize collapsing pressure.

8. A chuck having a shank provided with a cylindrical wall extending inwardly from one end concentric with its longitudinal axis, and a shoulder spaced from said end and crossing said axis to provide a recess, a tubular collet extended into the recess and seated against said shoulder having its outer longitudinal surface tapered with the larger end thereof adjacent said shoulder, a nose-piece having a portion wedged between and fitting said wall and said outer surface, and a clamping ring adjustably mounted on said shank adjacent said end and overlapping a part of said nose-piece, the facing surfaces of the collet and nose-piece collectively having an annular groove and shoulders, and a tension spring disposed in said groove and engaging said shoulders.

9. A chuck having a shank provided with a cylindrical wall extending inwardly from one end concentric with its longitudinal axis, and a shoulder spaced from said end and crossing said axis to provide a recess, a tubular collet extended into the recess and seated against said shoulder having its outer longitudinal surface tapered with the larger end thereof adjacent said shoulder, a nose-piece having a portion wedged between and fitting said wall and said outer surface, a clamping ring adjustably mounted on said shank adjacent said end and overlapping a part of said nose-piece, and a stress relief ring interposed between the clamping ring and nose-piece at the zone of overlapping of said ring and nose-piece.

CHARLES E. DREW.

REFERENCES CITED

The following references are of record in the file of this patent:

UNITED STATES PATENTS

| Number | Name | Date |
|---|---|---|
| 533,733 | Nye | Feb. 5, 1895 |
| 611,159 | Webb | Sept. 20, 1898 |
| 642,235 | Knape | Jan. 30, 1900 |
| 1,714,136 | Probert et al. | May 21, 1929 |
| 1,953,830 | Park | Apr. 3, 1934 |
| 2,337,471 | Hines | Dec. 21, 1943 |
| 2,358,299 | Benjamin et al. | Sept. 19, 1944 |

FOREIGN PATENTS

| Number | Country | Date |
|---|---|---|
| 46,263 | Norway | June 5, 1926 |
| 295,908 | Great Britain | Aug. 23, 1928 |